United States Patent [19]
Dana

[11] Patent Number: 4,703,940
[45] Date of Patent: Nov. 3, 1987

[54] JOINT SLEEVE FOR PIPE WITH CONTOURED INNER SURFACE

[75] Inventor: William R. Dana, Corona del Mar, Calif.

[73] Assignee: Ameron, Inc., Monterey Park, Calif.

[21] Appl. No.: 899,237

[22] Filed: Aug. 21, 1986

[51] Int. Cl.[4] .......................... F16J 15/10; F16L 21/04
[52] U.S. Cl. .................................... 277/207 A; 277/1; 285/230; 285/231; 285/345
[58] Field of Search ............ 277/207 R, 207 A, 207 B, 277/1; 285/230, 231, 232, 345

[56] References Cited

U.S. PATENT DOCUMENTS

| | | |
|---|---|---|
| 2,590,565 | 3/1952 | Osborn . |
| 2,662,555 | 12/1953 | Hirsch ............................. 277/207 A |
| 3,041,077 | 6/1962 | Osterloh et al. . |
| 3,151,870 | 10/1964 | Lafferty .......................... 277/207 A |
| 3,204,988 | 9/1965 | Ouderkirk et al. . |
| 3,502,356 | 3/1970 | Schmunk ........................ 277/207 A |
| 3,637,239 | 1/1972 | Daniel ............................ 285/230 X |
| 3,692,336 | 9/1972 | Zon . |
| 3,990,730 | 11/1976 | Ekman ........................... 285/345 X |
| 4,027,901 | 6/1977 | Forni ............................. 285/230 X |
| 4,084,828 | 4/1978 | Jones ............................. 277/207 A |
| 4,087,120 | 5/1978 | Rumble . |
| 4,138,146 | 2/1979 | Rumble . |

FOREIGN PATENT DOCUMENTS

| | | | |
|---|---|---|---|
| 1258351 | 3/1961 | France .......................... 277/207 A |
| 2292918 | 6/1976 | France .............................. 285/230 |
| 708189 | 4/1954 | United Kingdom ................ 285/345 |

Primary Examiner—Robert S. Ward
Attorney, Agent, or Firm—Christie, Parker & Hale

[57] ABSTRACT

A joint sleeve for sealing the ends of adjacent pipe sections. Each pipe section end has a compressible sealing gasket encircling it proximate its end and a shoulder remote its end. The joint sleeve consists of a body able to encircle the pipe section ends and to compress the sealing gaskets so that an adequate seal is provided when the sleeve is disposed about adjacent pipe section ends. To resist the force imposed upon the sleeve by the rolled gasket which tends to urge the sleeve from the pipe end, the joint sleeve has an inner surface with a flared portion. When the sleeve is positioned on one pipe section end for storage and transport, the compressed gasket by virtue of the flared portion produces an axial force urging the joint sleeve body in a direction opposite the force imposed by the rolled gasket and against the shoulder to hold the sleeve on the one pipe section end. To assemble the pipe sections, the end of the other pipe section is inserted into the sleeve which also results in a force urging the sleeve against the shoulder. Due to the weight of the pipe sections, reaction forces from the gaskets are ineffective to displace the pipe sections.

12 Claims, 6 Drawing Figures

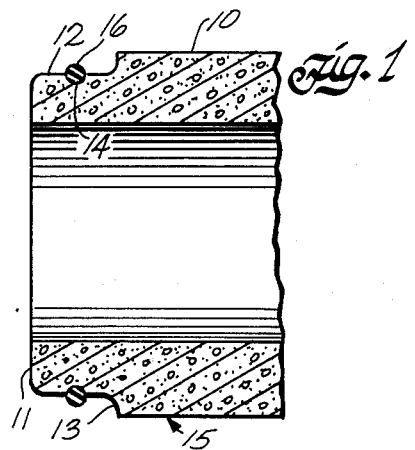
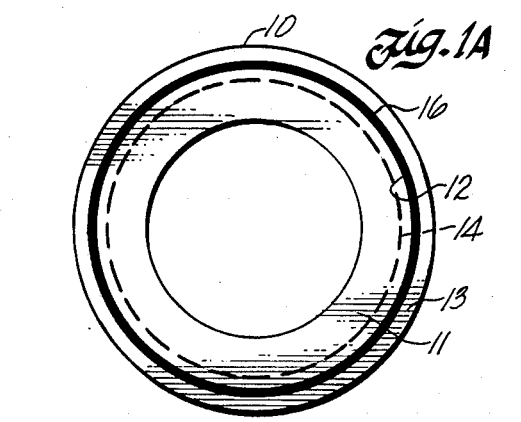
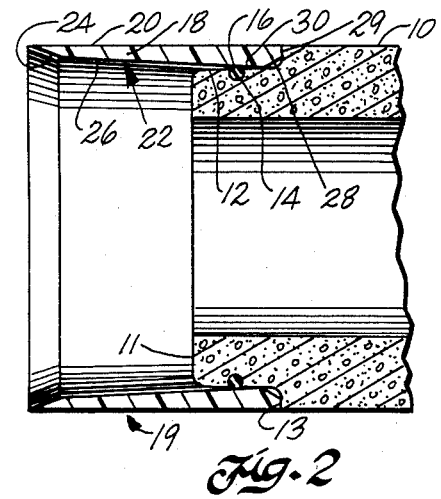
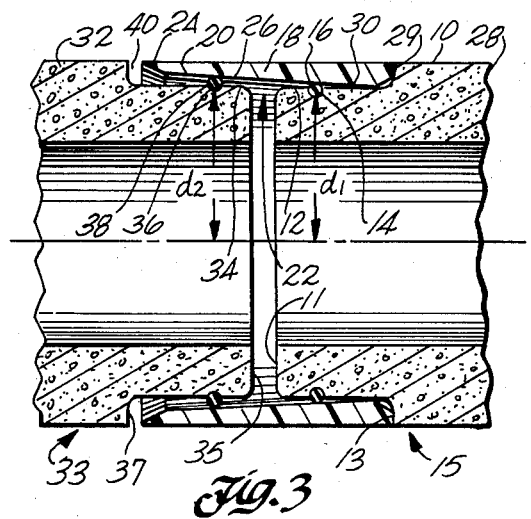
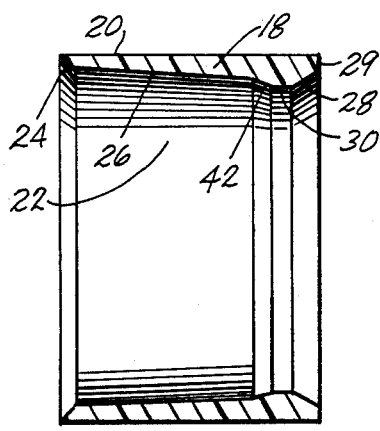
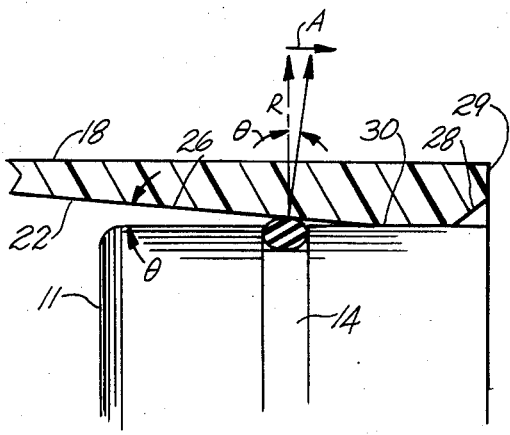

JOINT SLEEVE FOR PIPE WITH CONTOURED INNER SURFACE

FIELD OF THE INVENTION

The present invention is directed to a joint sleeve for sealing the ends of adjacent pipe sections and more particularly to a joint sleeve held on one pipe section end prior to the adjacent positioning of the other pipe section.

BACKGROUND OF THE INVENTION

Water, sewage and other liquids are often transported in subterranean pipelines. Typically, these pipelines consist of heavy sections of concrete pipe laid end-to-end in a trench. Other types of pipe, such as steel, cast iron, ductile iron, clay, plastic or fiberglass, can also be used. As can be appreciated, means must be provided for sealing the joints between adjacent pipe sections to prevent leaking of fluid, which may be harmful, into the ground and water table. Often this is accomplished by a double rubber gasket joint. The double rubber joint includes a sleeve with a cylindrical inner surface adapted to encircle recessed ends of the adjacent pipe sections. The sleeve also compresses rubber gaskets held in grooves about the outer circumference of each recessed pipe end to effectuate a tight seal.

For ease in storage and transportation of the pipe section prior to use in the field, the sleeve may be prepositioned on one end of each pipe section. Since the sliding of the sleeve over the pipe one end rolls the gasket, the gasket exerts a restoring force tending to urge the sleeve off the pipe. To counter this force, means must be provided to retain the sleeve on the pipe during the aforesaid storage and transportation and during the initial laying of the pipe section in a trench. Typically, with concrete pipe, cement mortar must be applied over the outer surface of the sleeve and the pipe ends, the mortar including an embedded wire mesh reinforcement. When cured, the reinforced mortar holds the sleeve on the pipe against the force of the rolled gasket.

Other means which have been used to hold the sleeve in place include adhesive bonding of the sleeve and pipe, pinning the sleeve to the pipe with radial dowels or bolts threaded through the sleeve to clamp it to the pipe.

Use of the exterior mortar and wire mesh or other means to retain the sleeve on the pipe has several disadvantages. The exterior mortar extends beyond the outer surface of the pipe requiring a wider, deeper, excavation of the trench proximate to the pipe ends. Accordingly, additional labor costs are involved to prepare the trench. Also, installation of the pipe section with a pipe sling may be more difficult due to the effect of the mortar upon the weight distribution. Another and more significant disadvantage where the joint diameter is larger than the outside of the pipe is that the pipe is prevented from being pushed through an excavation of a diameter equal to the outside of the pipe by a process called jacking. Furthermore, the joint is immobilized by the exterior mortar preventing movement needed to accommodate settlement of the pipe after installation. Settling of the immobilized pipeline may cause the pipe or its joints to crack and leak fluid. Factory application of the exterior mortar and wire mesh is expensive because of additional labor and material costs. Along these same lines, production is slowed while the mortar is allowed to cure. All in all, the overall manufacture of the pipe section is complicated. Accordingly, a need exists for a sleeve which is held onto a pipe end without requiring exterior mortar.

SUMMARY OF THE INVENTION

There is, therefore, provided in the practice of the embodiments of the present invention, a joint sleeve for sealing the ends of adjacent pipe sections. To cooperate with the sleeve to seal adjacent pipe sections, each pipe section end has a compressible sealing gasket encircling it proximate its end and a shoulder remote its end, although only one of the pipe section ends need necesssarily have such a shoulder. The joint sleeve consists of a body able to encircle the pipe section ends and to compress the sealing gaskets so that an adequate seal is provided when the sleeve is disposed about adjacent pipe section ends. To resists the force imposed upon the sleeve by the rolled gasket which tends to urge the sleeve from the pipe end, the joint sleeve has an inner surface with a flared portion. When the sleeve is positioned on one pipe section end for storage and transport, the compressed gasket by virtue of the flared portion produces an axial force urging the joint sleeve body in a direction opposite the force imposed by the rolled gasket and against the shoulder, holding the sleeve on the one pipe section end. During laying of the pipeline, the end of the other pipe section is inserted into the sleeve tending to roll the gasket encircling that pipe section end. The rolling of this gasket also, by virtue of the flared portion, urges the sleeve against the shoulder. Due to the weight of the pipe sections, reaction forces from the gaskets are ineffective to displace the pipe sections.

Use of the present invention obviates the need for exterior mortar or any other means for holding the sleeve in position on the pipe section end, overcoming the disadvantages associated with the use of exterior mortar noted above. Labor and material costs are reduced and, since the joint sleeve is not rigidly connected to the pipe sections, settling will not result in cracks and leaks. A particularly preferred joint sleeve conforming to the present invention is made of corrosion-resistant, lightweight materials such as epoxy or polyester resin reinforced with glass fibers to take advantage of their desirable properties and ease of manufacture.

BRIEF DESCRIPTION OF THE DRAWINGS

These and other features and advantages of the present invention will be better understood by reference to the following detailed description when considered in conjunction with the accompanying drawings wherein:

FIG. 1 is a side section view of a pipe end adapted to receive a sleeve according to the present invention;

FIG. 1A. is an end view of the pipe end of FIG. 1;

FIG. 2 is a side section view of the pipe end of FIG. 1 with a sleeve according to the present invention;

FIG. 3 is a side section view of the pipe end and sleeve of FIG. 2 with the remaining pipe end in place;

FIG. 4 is a side section view of an alternate embodiment of the sleeve according to this invention; and FIG. 5 is an enlarged view of one end of a pipe section with the sleeve positioned thereon showing the forces generated by the compressed gasket.

DETAILED DESCRIPTION

The present invention pertains to a joint sleeve for sealing the ends of adjacent pipe sections such as those used for the subterranean transport of water, sewage and other liquids. In a typical and well known fashion, pipe sections are laid end to end in a trench prepared for such pipe sections, the trench subsequently being filled in with earth, covering over the pipe sections. The pipe sections may also be installed above ground on supports or underwater.

With reference to FIGS. 1 and 1A, a portion of a pipe section 10 is shown. While the pipe section 10 is depicted and will hereinafter be described as being fashioned from concrete as is typical in the art, it is to be understood that the joint sleeve according to the present invention can also be used with steel, cast iron, ductile iron, clay, plastic, fiberglass, or other types of pipes. Furthermore, it is to be understood that while the following description refers to pipe sections, the invention as described herein contemplates fittings such as elbows, branch connections or the like, as well as actual pipe sections. The pipe section 10 terminates at a radial end face 11 which adjoins a like end face 35 of another pipe section 32 (FIG. 3) during the laying of the pipeline. Contiguous to the end face 11 the pipe section 10 has an encircling recess 12 which terminates, opposite the end face 11, at a radially outwardly projecting shoulder 13. Together the recess and end face define one end 15 for the pipe section 10.

As will become evident, the pipe section one end 15 need not have a recess 12. Instead the one end 15 could be cylindrical and of a diameter like the remainder of the pipe section, the shoulder being defined by a plurality of radially outwardly projecting spines or one continuous ring. The one end 15 as described above, however, is preferred from a manufacturing and handling standpoint.

To prevent the liquid being carried by the pipeline from leaking out past the end face 11 and along recess 12 to the environment and for other purposes which will hereinafter become evident, a resilient gasket 16 is provided about the one end 15. A groove 14 disposed about the recess 12 and encircling its outer surface is adapted to partially cradle and seat the compressible sealing gasket 16 on the pipe one end 15. While gasket 16 is preferably composed of rubber, it is to be understood that other resilient materials are contemplated. Gasket 16 is round to elliptical in cross section and when seated in groove 14 projects outwardly from the recess 12 as shown in the drawings. The gasket can also have a square, rectangular or other shape of cross-section.

To cooperate with gasket 16 and prevent the fluid carried by the pipeline from leaking to the environment, a joint sleeve 18 as shown in FIGS. 2, 3 and 5 is provided. Sleeve 18 includes a body 19 adapted to encircle the pipe section end. The body 19 has an outer surface 20 of a diameter comparable to the shoulder 13 and an inner surface 22. In the preferred embodiment, the inner surface 22 is flared and is divided into, viewing FIG. 2 from right to left, a leading conical taper 28 which terminates at a cylindrical surface 30. From the cylindrical surface 30, a gradually flared surface 26 extends substantially over the remainder of the inner surface 22, terminating at a conical lead-in 24. While sleeve 18 is preferably composed of a reinforced thermosetting resin to take advantage of its corrosion resistance, light weight and ease of manufacture, it is to be understood that other materials are contemplated.

To position sleeve 18 on pipe section 10 as shown in FIG. 2, it must be slid into place about the one end 15 and more particularly the recess 12. The leading conical surface 28 aids in the positioning of the sleeve by compressing gasket 16 until it can pass under cylindrical surface 30. Sleeve 18 stops when its leading edge 29 engages the shoulder 13. At this point, cylindrical surface 30 has just passed over gasket 16 so that gasket 16 is compressed against the flared surface 26 as shown in FIG. 5, forming a liquid-tight seal. The outer surface 20 provides a smooth, substantially continuous transition between the pipe section 10 and the sleeve 18. Due to the nature of the flared surface 26, the compressed gasket 16 imposes a force F which is against and normal to the flared surface 26. Normal force F can be broken down into radial and axial component forces R and A, as shown in FIG. 5. Axial component A has a magnitude of F sine $\theta$ where $\theta$ is the angle between radial component R and force F. $\theta$ is also the angle the flared surface 26 makes with the recess 12. Axial component A urges the sleeve 18 against the shoulder 13 holding it in place during storage of the pipe and sleeve and during assembly of the pipeline. Constructing the sleeve flared surface 26 such that is from one to five degrees has been found sufficient to hold sleeve 18 firmly in place on pipe section 10. Additionally, the structure of the sleeve body 19 and more particularly the inner surface 22 lends the sleeve, if constructed from plastic, to molding techniques, such as injection molding, which require draft for removal of the molded sleeve.

Turning to FIG. 3, assembly of a pipeline using the sleeve 18 can be described. Adjacent pipe section 32 is depicted as essentially the reciprocal of pipe section 10, having and end 33 including encircling recess 34 terminating at one end at the end face 35 and at the opposite end by the radially outward projecting shoulder 37. A groove 36 encircles the outer surface of recess 34 to partially cradle a compressible sealing gasket 38.

During the laying of the pipeline, pipe section 10, having the sleeve 18 positioned on its one end 15 is laid in a suitably prepared trench. Thereafter, adjacent pipe section 32 is likewise lowered into the trench and the end 33 is inserted into the sleeve 18 as shown in FIG. 3. The lead-in surface 24 aids in alignment and insertion of the pipe section and begins compressing gasket 38. The gasket 38 is then further compressed by the flared surface 26 so that a liquid-tight seal is formed between pipe section 32 and sleeve 18. The compression of the gasket 38 by the flared surface 26 again results in a force against the sleeve 18 normal with respect to the flared surface 26. This normal force has an axial component urging the sleeve against the shoulder 13 and a reactionary axial force on the pipe section 32 urging the pipe section 32 to the left, as shown in FIG. 3, outwardly from the sleeve 18. Accordingly, means must be provided to hold pipe section 32 in place. In the preferred embodiment depicted, frictional forces resulting from the weight of pipe sections 10 and 32 on their supports are sufficient to hold both sections in place inside sleeve 18 against reaction forces once the sections are placed in the trench. Alternatively, for lighter pipe sections or as an added measure with the preferred embodiment depicted, field-applied adhesive in the gap 40 between shoulder 37 and the sleeve 18 could be used.

With reference to FIG. 4, an alternate embodiment of the sleeve 18 is depicted. In this embodiment, the inner surface 22 has an additional conical surface 42 placed between cylindrical surface 30 and flared surface 26 and positioned so that it will compress the gasket 16 when leading edge 29 abuts shoulder 13. Conical surface 42 has a steeper slope (angle greater than one to five degrees) than the flared surface 26 so that compression of the gasket 16 develops a larger axial component A urging sleeve 18 to the right, as shown in FIG. 5, to hold sleeve 18 in place.

While pipe section 32 is depicted as having a shoulder 37 similar to the shoulder 13 of pipe section 10 it need not have such a shoulder. Pipe section 32 could be a pipe section with an outer diameter equal to that of recess 34. In fact, if another means were provided for halting the movement of sleeve 18 on pipe section 10, such as external rings or spokes, sleeve 18 could be used to adjoin and seal two adjacent pipe sections with outer diameters equal to that of recesses 12 and 34. The embodiment depicted is perferred, however, since a pipeline having substantially a continuous outer diameter requires less trench preparation.

While gasket 16 and 38 are depicted as being held in place by groove 14 and 36, any method of holding gaskets 16 and 38 in place longitudinally on their respective recesses 12 and 34 would suffice for application of the present invention. Further, the end recess 34 of pipe section 32 may have a diameter $d_2$ greater than the diameter $d_1$ of end recess 12 of pipe section 10 to compress gaskets 14 and 36 equally.

The preceding description has been presented with reference to a presently preferred embodiment of the invention shown in the accompanying drawings. Workers skilled in the art and technology to which this invention pertains will appreciate that modifications could be made without departing from the spirit and scope of this invention. Accordingly, the foregoing description should not be read as pertaining only to the precise structures and techniques described, but rather should be read consistent with and as support for the following claims which are to have their fullest fair scope.

What is claimed is:

1. A joint sleeve for sealing the ends of adjacent pipe sections, each pipe section end having a compressible sealing gasket encircling it proximate its end and at least one of the pipe section ends having a shoulder remote its end comprising:
    a sleeve having a body adapted to encircle the pipe section ends and compress the gaskets to seal the pipe section ends when the ends are adjacent, the body having an inner surface contoured such that the compressed gasket on the pipe section having the shoulder produces an axial force urging the body against the shoulder to hold the sleeve on the one pipe section.

2. The joint sleeve of claim 1 wherein the inner surface is conical defining an angle whose measure is substantially between 1 and 5 degrees with respect to the pipe section end.

3. The joint sleeve of claim 2 wherein the sleeve body includes a lead-in surface which merges with the inner surface, the lead-in surface adapted to compress the gasket in response to passing of the sleeve body over the pipe section end.

4. The joint sleeve of claim 3 wherein the inner surface includes a cylindrical portion adapted to closely encircle the pipe section end between the gasket and the shoulder.

5. The joint sleeve of claim 1 wherein the inner surface includes a conical portion to compress the gasket, the conical portion having a measure greater than 1 to 5 degrees.

6. A pipeline for handling fluids comprising:
    at least two pipe sections adapted to be placed end to end to define the pipeline, each section having ends with an encircling, compressible gasket and at least one of the ends including a shoulder spaced from its gasket; and
    a joint sleeve adapted to encircle both sections when the pipe sections are placed end to end, such joint sleeve having an inner surface to compress such gaskets to provide a fluid-tight seal between the pipe sections, the inner surface contoured so that compression of at least the gasket on the one end with the shoulder results in a force urging the sleeve to abut the shoulder to hold such sleeve in place.

7. The pipeline of claim 6 wherein each of the pipe section ends includes a groove to cradle the gasket.

8. The pipeline of claim 6 wherein the inner surface of the joint sleeve is conical and defines an angle of at least 1 to 5 degrees with respect to the pipe section one end.

9. The pipeline of claim 8 wherein the inner surface of the joint sleeve is conical over substantially the entire length of the sleeve, the compression of such gaskets resulting in a force upon the sleeve urging engagement with the shoulder to hold the sleeve in place.

10. The pipeline of claim 9 wherein the inner surface includes a conical portion to compress the gasket at the one end, the conical portion making an angle with respect to the one end greater than the angle that the inner surface makes with the one end.

11. A method for sealing the ends of adjacent pipe sections against fluid leakage comprising each such section having an end with an encircling, compressible sealing gasket and one section including a shoulder spaced from the gasket, the method comprising:
    passing a sleeve over one pipe section end, the sleeve having an inner surface contoured to compress the gasket about the one end, such compression resulting in a force urging the sleeve against the shoulder to retain such sleeve on the one end; and
    inserting the other pipe section end into the sleeve to a position adjacent the other pipe section, the sleeve compressing the gasket encircling the other pipe section, compression of the gaskets by the sleeve sealing the pipe sections against leakage of fluid.

12. The method of claim 11 further including the step of inserting an adhesive between the sleeve and at least the other pipe section end.

* * * * *

UNITED STATES PATENT AND TRADEMARK OFFICE
CERTIFICATE OF CORRECTION

PATENT NO. : 4,703,940

DATED : November 3, 1987

INVENTOR(S) : William R. Dana

It is certified that error appears in the above-identified patent and that said Letters Patent is hereby corrected as shown below:

Column 1, line 20, after "leaking of" insert -- the --.

Column 2, line 18, change "resists" to -- resist --.

Column 2, line 58, change "FIG. 1A." to -- FIG. 1A --.

Column 3, line 6, change "well known" to -- well-known --.

Column 4, line 26, after "such that" insert -- θ -- before "is".

Column 4, line 36, after "having" change "and" to -- an --.

Signed and Sealed this

Fourth Day of October, 1988

Attest:

DONALD J. QUIGG

Attesting Officer     Commissioner of Patents and Trademarks